UNITED STATES PATENT OFFICE.

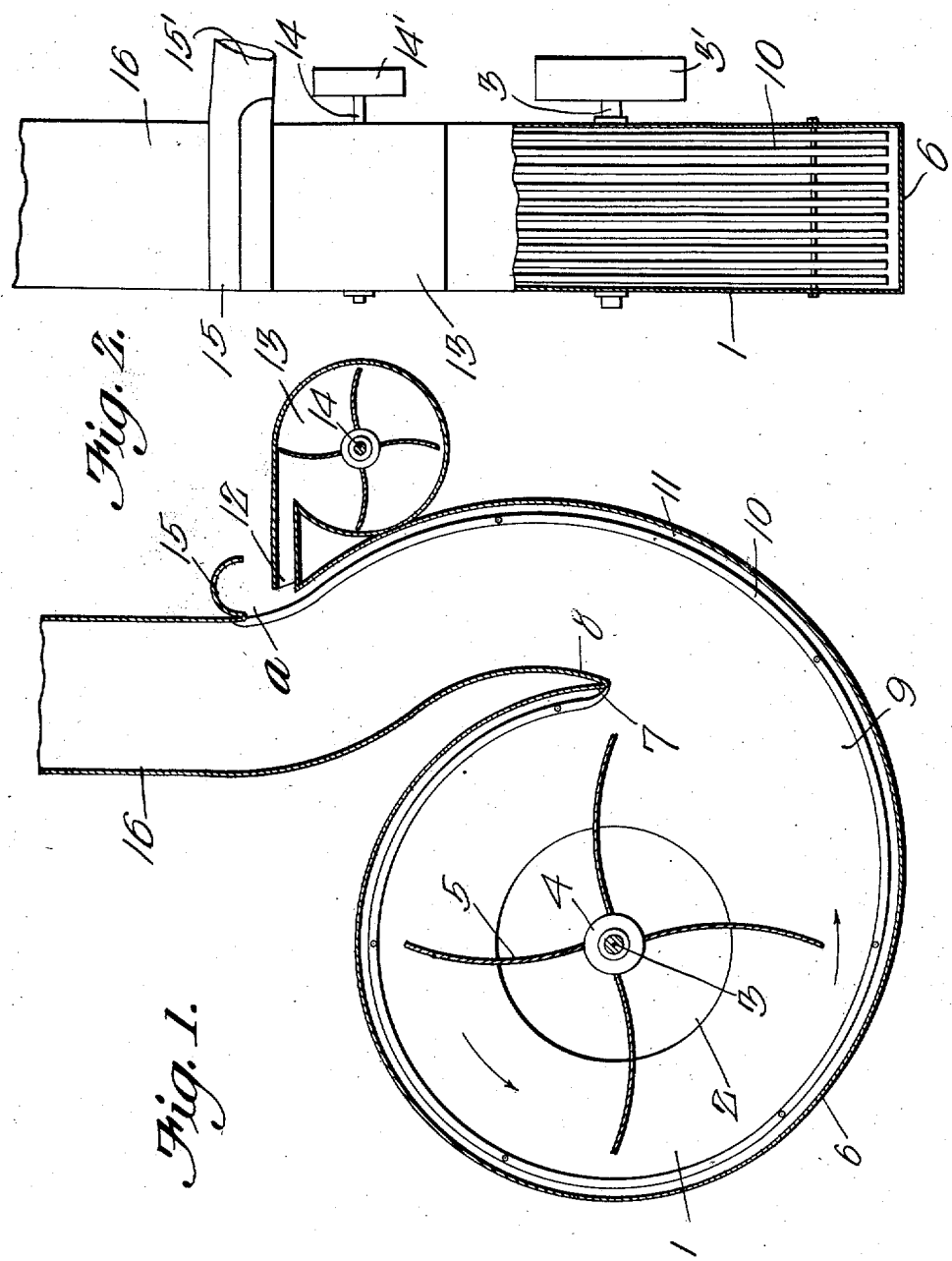

HOMER F. HUTTON, OF JEFFERS, MONTANA.

GRAIN-SEPARATOR.

1,019,962.  Specification of Letters Patent.  Patented Mar. 12, 1912.

Application filed July 6, 1911. Serial No. 637,129.

*To all whom it may concern:*

Be it known that I, HOMER F. HUTTON, a citizen of the United States, residing at Jeffers, in the county of Madison and State of Montana, have invented a new and useful Grain-Separator, of which the following is a specification.

This invention relates to improvements in grain separators, the primary object of the invention being the provision of a separating device adapted to be attached to the fan casing of the straw stacking conduit of a threshing machine, whereby the grain carried from the machine by the straw is separated from the straw and the chaff and delivered in such cleaned and separated condition to one side of the stacker conduit.

Another object of this invention is the provision of a grain separating device adapted to be so disposed with relation to the fan chamber of a pneumatic stacking device of a threshing machine as to permit the straw to be pneumatically driven through a conduit, the centrifugal force of the fan acting upon the straw and the loose grain therein to throw the grain in such a manner as to separate it from the straw and at the same time carry it up an inclined plane in front of an auxiliary fan device which separates the chaff from said grain, forcing the same with the straw through the stacker conduit but permitting the grain to be separated above the auxiliary fan outlet and delivered in a clean condition to one side of the stacker.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a sectional view taken through the fan casing and adjacent portion of a stacker conduit or tube with the present invention in operable relation therewith. Fig. 2 is an elevation looking in the direction of the auxiliary fan casing, with a portion of the main fan casing shown in section to illustrate the grate disposed therein.

Referring to the drawings, the numeral 1 designates the fan casing of the pneumatic stacker of a threshing machine, the same being provided with the inlet opening 2, the fan shaft 3, the fan hub 4 and the fan blades 5, the same being mounted concentrically of and within the casing and adapted to be rotated in the direction of the arrow, Fig. 1, so that the straw entering the casing through the opening 2 will be given a motion to centrifugally throw the same against the outer and lower wall of the casing and finally upwardly and out of the stacker conduit 16. It will be noted that the wall at 7 constitutes with the wall 8 a very sharp curve, while the wall 9 is eccentric to the wall of the fan casing and provides the swelled or enlarged portion where the grain is separated from the straw by the centrifugal action imparted thereto by the fan. As the straw is delivered through the mouth of the fan casing into the lower end of the conduit 16 the heavier portion, that is, the loose grain carried by the straw is thrown against the curved slats 10, and through the spaces therebetween against the curved wall 11, the fan action carrying the straw and the grain upwardly and outwardly through the conduit 16 while the grain stays between the slats 10 and the casing wall 11, the grain emerging past the mouth of the conduit or spout 12 of the auxiliary fan casing 13, whose fan 14 is so rotated therein as to throw a blast outwardly and into the conduit 16, thereby separating the chaff or tailings that may be carried with the grain and blowing the same between the apertures or slots of the slatted portions 10 into the stacker conduit 16, the heavier grain being propelled by centrifugal action, so as to strike the curved portion 15, which conducts the said grain into the conduit 15′, and away from the machine. In order to rotate the respective fans, pulleys 3′ and 14′ are employed as clearly shown in Fig. 2.

Although this separator has been shown and described as connected only with a straw stacker conduit, it is evident, however, that it may be connected with any grain fan, and cause the grain to be separated from the straw and lighter material.

From the foregoing description it is evident that the apparatus herein set forth may be readily applied to the fan casing and stacker conduit of a threshing machine, and that the grain generally carried out of the threshing machine with the straw, may be readily separated by the centrifugal action imparted thereto by the fan 5 of the fan casing of the stacker and that it is evident that the slatted portions 10 will permit the grain to be thrown against the wall 11 and carried by said centrifugal force upwardly in front of the spout 12, where the light tailings or chaff will be separated from the grain and thrown into the stacker conduit 16 to be carried away with the straw, the heavier grain, or rather, the perfect grain being driven by such action across the mouth of the spout 12 and into the aperture $a$ and finally conducted against the deflecting inverted spout 15 which causes the grain to be thrown downwardly into the conducting spout 15′ where the same may be conducted to sacks or other places, thus saving the perfect grain that is usually carried away with the straw at a loss.

What is claimed is:—

1. The combination with the fan and fan casing of a threshing machine, of a main conduit in communication with the fan casing, a slatted frame disposed in the wall adjacent the outlet of the fan casing, an auxiliary fan for separating the lighter material from the grain disposed at the upper end of the slatted frame, and means to convey the grain after passing the outlet of said auxiliary fan away from the main conduit.

2. The combination with the fan and fan casing of a threshing machine, of a main conduit in communication with said casing, the lower wall of said conduit being eccentrically disposed with relation to the wall of the fan casing, a grate mounted parallel to the entire curved wall of the fan casing and the outer wall of the main conduit to prevent the straw contacting the curved wall of the fan casing and the outer wall of the main conduit during its passage through the fan casing and conduit, and means for receiving the grain forced through the grate and propelled against the curved wall of the fan casing and the outer wall of the main conduit.

3. The combination with the fan and fan casing of a threshing machine, of a main conduit in communication with said casing, the lower wall of said conduit being eccentrically disposed with relation to the wall of the casing, a grate mounted in the main conduit and against which the straw is thrown by centrifugal force after leaving the fan casing, a fan disposed in the conduit at the upper end of the grate for separating the lighter particles from the grain, and means for receiving the grain after the light particles are separated therefrom.

4. The combination with a stacker fan and fan casing of a threshing machine, of a stacker conduit leading from said casing, a curved grate conforming to the shape of the adjacent wall of the conduit disposed in the stacker conduit and against which the straw ejected from the fan casing is projected thereagainst by centrifugal force, said stacker being provided with an aperture at the upper end of the grate to permit the grain to pass out of the stacker conduit, and a deflector disposed above said aperture to convey the grain away from said conduit as it leaves the stacker conduit.

5. The combination with a stacker fan and fan casing of a threshing machine, of a stacker conduit leading from the casing, a curved grate disposed in the stacker conduit and against which the straw ejected from the fan casing is projected thereagainst by centrifugal force, an auxiliary fan casing in communication with the stacker conduit at a point near the upper end of the grate, a fan therein for separating lighter particles of the grain as it passes between the grate and the outer wall of the conduit, said stacker being provided with an aperture in the wall thereof, beyond the inlet from the auxiliary fan casing to permit the grain to pass out of the stacker conduit, and a deflector to convey the grain away from said conduit as it leaves the stacker conduit.

6. The combination with a stacker fan casing and a fan, of a stacker conduit leading from said fan casing, means disposed therein for permitting the centrifugal force imparted to the material leaving the fan casing to separate the grain and heavier particles from the straw, means for deflecting said heavier particles from and away from the stacker conduit, and pneumatic means for separating the lighter particles from the heavier particles previous to the ejecting of the heavier particles from the stacker conduit.

7. The combination with a pneumatic stacker having a fan casing and fan, of a stacker conduit, the mouth of which is disposed tangentially to and in communication with the fan casing, the outer wall of said stacker being provided with an aperture above the axis of the fan casing, a curved grating disposed adjacent said outer wall and against which the straw and grain are projected by the action of the centrifugal force imparted thereto by the fan and the fan casing, a deflector connected to the stacker conduit for deflecting the grain and heavier particles therefrom, and an auxiliary fan casing in operable connection with the outer wall of the stacker conduit for separating the lighter particles from the heavier particles and projecting the same into the stacker conduit to be carried away with the straw.

In testimony that I claim the foregoing as my own, I have hereto affixed my signature in the presence of two witnesses.

HOMER F. HUTTON.

Witnesses:
C. W. CHOWNING,
H. E. STEFFENS.